United States Patent [19]

Mashburn et al.

[11] 4,162,813
[45] Jul. 31, 1979

[54] BEARING ASSEMBLY AND THE LIKE FOR USE IN CORROSIVE AND NON-CORROSIVE ATMOSPHERES

[75] Inventors: Douglas N. Mashburn, Knoxville; Harold C. Woodall, Kingston; Ralph R. Wright, Oak Ridge, all of Tenn.

[73] Assignee: The United States of America as repesented by the United States Department of Energy, Washington, D.C.

[21] Appl. No.: 666,533

[22] Filed: Mar. 15, 1976

[51] Int. Cl.$^2$ ............................................. F16C 33/24
[52] U.S. Cl. ........................ 308/237 R; 308/DIG. 5; 308/DIG. 8
[58] Field of Search ............... 308/237 R, 237 A, 239, 308/241, DIG. 5, DIG. 8

[56] References Cited

U.S. PATENT DOCUMENTS

| 2,696,413 | 12/1954 | Wheildon, Jr. ............... 308/DIG. 8 |
| 2,887,766 | 5/1959 | Fike et al. ..................... 308/DIG. 8 |

*Primary Examiner*—Richard A. Bertsch
*Attorney, Agent, or Firm*—Dean E. Carlson; Stephen D. Hamel; Fred O. Lewis

[57] ABSTRACT

This invention relates to a novel machine element characterized by mutually rubbing surfaces which are composed of dissimilar materials having high hardness, a low coefficient of friction, and resistance to corrosion by halogen-containing atmospheres. As exemplified by the preferred embodiment for use in gaseous $UF_6$, the rubbing surfaces are chemically deposited nickel and anodized aluminum. These surfaces permit jam-free operation despite long-term exposure to $UF_6$. Preferably, both surfaces have a hardness of at least about 500 $HV_{100}$ on the Vickers hardness scale, and preferably the anodized-aluminum surface is of a type having comparatively little tendency to sorb uranium hexafluoride.

10 Claims, No Drawings

BEARING ASSEMBLY AND THE LIKE FOR USE IN CORROSIVE AND NON-CORROSIVE ATMOSPHERES

BACKGROUND OF THE INVENTION

This invention relates generally to an improved machine element of the kind comprising a pair of relatively movable members having mutually contacting, or rubbing surfaces. In accordance with the invention, the movable members have improved contacting surfaces which permit jam-free operation even when the machine element is operated in highly corrosive atmospheres for long periods of time.

This invention was made in the course of, or under, a contract with the Energy Research and Development Administration.

The need for this invention became evident in the course of the design of a probe actuator which was to be installed in a test loop and operated intermittently while exposed to gaseous uranium hexafluoride ($UF_6$) being circulated through the loop. The actuator design called for a pair of splined members, which were to be slidably mounted in guide brackets. Previous investigation had established that jam-free operation could not be obtained in $UF_6$ by employing rubbing surfaces consisting respectively of Monel and Teflon. It was also known that the use of Monel and brass as the rubbing surfaces resulted in almost immediate galling in $UF_6$ atmospheres.

SUMMARY OF THE INVENTION

Accordingly, it is an object of this invention to provide a novel machine element of the kind comprising a pair of relatively movable members having mutually contacting surfaces.

It is another object to provide an improved machine element having mutually contacting surfaces which facilitate relative movement therebetween despite protracted exposure to corrosive environments.

It is another object to provide an improved machine element having mutually contacting dissimilar surfaces having a higher hardness than the reaction products which accumulate thereon when the machine element is exposed to corrosive atmospheres.

It is another object to provide a machine element whose rubbing surfaces are designed with relatively high hardness and small area, thus permitting operation at high contact pressures.

Other objects will be made evident hereinafter.

The invention can be summarized as follows: a machine element comprising relatively movable first and second members having mutually contacting surface portions, one of which surface portions is alumina and the other of which is chemically deposited nickel.

DESCRIPTION OF THE PREFERRED EMBODIMENTS

This invention is broadly applicable to machine elements which comprise a pair of relatively movable members having mutually rubbing surfaces. For example, the invention is applicable to slidable-spline couplings, shaft-and-bearing assemblies, screw-type fasteners, and telescoped members. In the preferred form of our invention, one of the rubbing surfaces is chemically deposited nickel and the other is alumina. (As used herein, the term "alumina" includes both natural and synthetic aluminum oxide—examples of the latter being anodized aluminum or aluminum alloys.) Thus, in contrast to conventional practice, both of the rubbing surfaces are materials of relatively high hardness. A machine element with these rubbing surfaces can be used satisfactorily in non-corrosive atmospheres but is particularly useful in corrosive halogenating atmospheres, meaning atmospheres containing halogens or halogenides—as, for example, atmospheres containing fluorine, chlorine, bromine, anhydrous hydrogen fluoride, or uranium hexafluoride. When used in non-corrosive atmospheres, the rubbing surfaces may be coated with conventional lubricants.

If the machine element is to be used in a corrosive atmosphere, we prefer that the chemically nickel-plated surface and the alumina surface have hardnesses exceeding the hardness of the principal corrosion products which can be expected to accumulate on either or both of the rubbing surfaces. For instance, where the machine element is to be exposed for appreciable periods to gas streams containing $UF_6$, some accumulation of uranium fluorides (e.g., $UO_2F_2$, $UF_4$, and $UF_5$) can be expected. Consequently, (and contrary to conventional bearing practice), we design both the chemically deposited nickel and the anodized aluminum rubbing surfaces with high hardness—i.e., a hardness exceeding 500 $HV_{100}$, as measured on the well-known Vickers hardness scale. (Where $HV_{100}$ represents the load in grams applied to the indentor.) As a result, the products which accumulate on the rubbing surfaces are relatively soft in comparison to the surfaces and serve as lubricants therefor. The nickel surface may be formed by any suitable chemical-plating technique.

Some types of anodized aluminum tend to sorb $UF_6$. Consequently, in the preferred embodiment of our machine element as designed for use in $UF_6$ we form one of the rubbing surfaces of anodized aluminum having relatively little tendency toward such sorption. One such anodized aluminum, sometimes referred to in the literature as hard-anodized aluminum, is described in the following publication, which also describes methods for producing the same: L. F. Spencer, "Anodizing of Aluminum Alloys—Hardcoating," *Metal Finishing* (Nov. 1968). As compared with more conventional anodized-aluminum coatings, the hardcoatings are characterized by higher resistance to abrasion and wear and by a higher density. The alumina hardcoatings typically vary in thickness from 1–5 mils and are brown to black in color. Where our machine element is to be exposed to $UF_6$ for long periods, we prefer to remove all traces of water from the prepared rubbing surfaces and then coat them with any suitable lubricant resistant to $UF_6$, such as a conventional perfluorocarbon oil or grease.

The following specifically illustrates our invention as applied to providing a satisfactory slider-and-bracket assembly for use in a probe actuator to be used in gaseous $UF_6$ (see copending, coassigned U.S. patent application Ser. No. 667,005, filed on Mar. 15, 1976). In this instance the bracket was an elongated channel-shaped member composed of mild steel and having a pair of longitudinally extending guide grooves formed in the inner faces of its side walls. The slider was an aluminum-alloy (6061 T-6) member positioned in the bracket and formed with a pair of lateral splines slidably fitted in the aforementioned guide grooves.

EXAMPLE

The entire bracket was provided with an adherent electroless nickel plating approximately 0.7 mil thick. Plating was accomplished in the conventional manner in a conventional acid plating bath of the nickel hypophosphite type. The plated bracket had a surface hardness exceeding 500 $HV_{100}$ units on the Vickers scale. The entire aluminum slider was anodized under conditions selected to increase its hardness while providing an alumina surface having little tendency to sorb $UF_6$. Anodization was conducted in a conventional sulfuric acid bath (13 wt-% free $H_2SO_4$ saturated with carbon dioxide), at a temperature of 0°C.±5°. A current of 12-36 amps per square foot (ASF) was maintained until an applied voltage of 75 volts was required. The voltage then was maintained at 75 volts for approximately one hour or until the current density fell below 6 ASF. The surface hardness of the resulting anodized slider was approximately 700 $HV_{100}$. As determined by the well-known Mar scratch test conducted with a 2 kg load at a 45° angle, the anodized surface had relatively little tendency to sorb $UF_6$. After preparation as described, the slider and bracket were baked in a vacuum oven at less than 500 μm Hg pressure at 250° F. for one week to remove all traces of water vapor. The parts then were coated with a thin layer of Krytox, a perfluoroalkylpolyether lubricant manufactured by DuPont de Nemours & Co. ("Cello-seal," a product of Fisher Scientific Company, also can be used.) After assembly, the resulting machine element was installed in the aforementioned probe-positioner and operated intermittently for four weeks in a test loop in which hot gas consisting predominantly of $UF_6$ was circulated. The probe-positioner operated satisfactorily throughout the test, with no jamming of the slider. Subsequent inspection revealed that the slider assembly was in good condition and still operable despite the presence of heavy uranium-fluoride deposits on its surfaces, presumably resulting from inleakage of moist air.

Referring to the foregoing example, the objectives of this invention can be achieved by anodizing all or selected portions of the slider and, similarly, by chemically nickel-plating all or selected portions of the bracket. The bracket need not be of steel composition, but may be any suitable substrate which can be provided with the desired plating. If desired, the slider may be composed of any suitable material—say, steel—to which an overlay of anodized aluminum has been affixed in any suitable manner.

The foregoing example has been provided for the purpose of illustration, and it will be apparent to those versed in the art that various modifications may be made within the scope of the invention as defined in the appended claims. As indicated above, the improved machine element may be of various configurations and is useful in both corrosive annd non-corrosive atmospheres.

What is claimed is:

1. A machine element comprising first and second members having relatively movable mutually contacting surface portions, one of which surface portions is alumina and the other of which consists essentially of chemically deposited nickel.

2. The machine element of claim 1 wherein the alumina surface portion has a hardness exceeding about 500 $HV_{100}$ on the Vickers hardness scale.

3. The machine element of claim 1 wherein the nickel surface portion has a hardness exceeding about 500 $HV_{100}$ on the Vickers hardness scale.

4. The machine element of claim 1 wherein both of said surface portions have a hardness exceeding about 500 $HV_{100}$ on the Vickers hardness scale.

5. The machine element of claim 1 wherein both of said surface portions are substantially free of water.

6. The machine element of claim 1 wherein said surfaces have a coating of a lubricant which is stable in halogenating atmospheres.

7. The machine element of claim 1 wherein said alumina surface portion has a hardness exceeding 600 $HV_{100}$ on the Vickers hardness scale.

8. A machine element comprising first and second members having relatively movable mutually contacting surface portions, each of said portions having a hardness exceeding about 500 $HV_{100}$ on the Vickers hardness scale, one of said surface portions being alumina and the other chemically deposited nickel, said surface portions having a coating of a lubricant which is stable in halogen-containing atmospheres.

9. The machine element of claim 8 wherein the alumina surface portion is on a steel substrate and wherein the alumina surface portion is on an aluminum-alloy substrate.

10. The machine element of claim 9 wherein the alumina surface portion has a hardness exceeding 600 $HV_{100}$ on the Vickers hardness scale.

* * * * *